United States Patent
Li et al.

(10) Patent No.: US 10,833,295 B2
(45) Date of Patent: Nov. 10, 2020

(54) BATTERY CELL AND BATTERY

(71) Applicant: Ningde Amperex Technology Limited, Ningde (CN)

(72) Inventors: Suochen Li, Fujian (CN); Wei Liang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 16/392,737

(22) Filed: Apr. 24, 2019

(65) Prior Publication Data

US 2020/0251693 A1    Aug. 6, 2020

(30) Foreign Application Priority Data

Jan. 31, 2019   (CN) .......................... 2019 1 0099632

(51) Int. Cl.
*H01M 2/10* (2006.01)
*H01M 2/02* (2006.01)

(52) U.S. Cl.
CPC ......... *H01M 2/024* (2013.01); *H01M 2/0207* (2013.01)

(58) Field of Classification Search
CPC ........................... H01M 2/024; H01M 2/0207
See application file for complete search history.

(56) References Cited

U.S. PATENT DOCUMENTS

| 6,083,640 | A | * | 7/2000 | Lee | ..................... | H01M 2/0277 |
| | | | | | | 429/161 |
| 9,099,696 | B2 | * | 8/2015 | Ahn | ..................... | H01M 2/0207 |

* cited by examiner

*Primary Examiner* — Jane J Rhee (57) ABSTRACT

An aspect of the present application provides a battery cell including an electrode assembly and a package bag accommodating the electrode assembly, the electrode assembly includes a first end surface and a second end surface disposed opposite to the first end surface, and the battery cell further includes a support assembly disposed between the electrode assembly and the package bag, and the support assembly has a cavity disposed opposite to the first end surface or the second end surface. Another aspect of the present application provides a battery. The purpose of the present application is to increase the storage amount of the electrolyte in the battery cell and the battery.

16 Claims, 9 Drawing Sheets

BATTERY CELL AND BATTERY

CROSS-REFERENCE TO RELATED APPLICATION

This application claims priority to and benefits of Chinese Patent Application Serial No. 201910099632.0, filed with the China National Intellectual Property Administration on Jan. 31, 2019, and the entire content of which is incorporated herein by reference.

FIELD OF THE APPLICATION

The present application relates to the field of batteries, more particularly to a battery cell and a battery.

BACKGROUND OF THE APPLICATION

At present, lithium-ion batteries have the advantages of high energy density, long cycle life, low self-discharge, no memory effect, high performance price ratio, etc., and are gradually being valued by people for widely used in various digital products, energy storage systems and automotive power systems.

The cycle of lithium ion batteries is accompanied by the process of SEI (solid electrolyte interface) film growth and repair, which requires constant consumption of electrolyte. For batteries used in energy storage systems, it must be ensured that a sufficient amount of electrolyte is maintained during its lifetime to continuously replenish the electrolyte consumed by the battery during the long cycle. Therefore, it is necessary to design a new structure of soft-pouch battery cell to increase the storage amount of the electrolyte without affecting the energy density.

In order to increase the storage amount of the electrolyte, the existing energy storage battery cells mainly increase a width or length of the battery cell to increase the storage space of the electrolyte without changing the size of the wound battery cell. Such a design sacrifices volumetric energy density and affects safety performance when the battery cell is abused, such as drop testing. Secondly, the unsealed space inside the pouch battery cell is large, which causes unnecessary waste. In particular, the inner unsealed region of position in which the tab extends is of great significance for the energy storage battery cell to utilize the unsealed region. Therefore, it is necessary to optimize the structure design of the existing soft-pouch battery cell for energy storage.

SUMMARY OF THE APPLICATION

In view of the problems in the related art, an object of the present application is to provide a battery cell to increase the storage amount of the electrolyte in the battery cell, thereby prolonging the cycle life of the battery cell.

To achieve the above object, an aspect of the present application provides a battery cell including an electrode assembly and a package bag accommodating the electrode assembly, the electrode assembly includes a first end surface and a second end surface disposed opposite to the first end surface. The battery cell further includes a support assembly disposed between the electrode assembly and the package bag, and the support assembly has a cavity disposed opposite to the first end surface or the second end surface.

According to an embodiment of the present application, the support assembly is disposed between at least one of the first end surface and the second end surface and the package bag.

According to an embodiment of the present application, the electrode assembly further includes a tab that passes through the first end face or the second end face and passes out of the cavity.

According to an embodiment of the present application, the support assembly includes a first assembly and a second assembly disposed opposite to the first assembly, the first assembly is provided with the cavity, and the tab passes between the first assembly and the second assembly.

According to an embodiment of the present application, the first assembly is detachably connected to the second assembly.

According to an embodiment of the present application, the first assembly includes a first portion and a second portion connecting the first portion, and the cavity is defined by the first portion and the second portion, at least one of the first portion and the second portion is provided with a through hole.

According to an embodiment of the present application, the first assembly further includes a reinforcing rib, one end of the reinforcing rib is connected to the first portion, and the other end of the reinforcing rib is connected to the second portion.

According to an embodiment of the present application, the first assembly further includes an arcuate portion, and both ends of the first portion are respectively connected to both ends of the second portion through the arcuate portion.

According to an embodiment of the present application, the first assembly further includes a fifth portion adjacent to the first end surface or the second end surface, the fifth portion is connected to the first portion, the second portion, and the arcuate portion, and the fifth portion is provided with the through hole.

Another aspect of the present application further provides a battery including the battery cell according to any one of above embodiments.

The beneficial technical effects of the present application are as follows:

The present application proposes a novel structure of soft-pouch battery cell, which does not change the size specifications of the original battery cell, and increases the storage space inside the soft-pouch battery cell that may accommodate free electrolyte. Therefore, the storage amount of the electrolyte in the battery cell may be effectively improved without sacrificing the energy density of the battery cell, and the design requirement for satisfying the long cycle life of the energy storage battery cell may be achieved. At the same time, the tab gluing process of the soft-pouch battery cell is omitted, the contact between the tab weld and the aluminum plastic film is isolated, so that the packaging performance for long cycle life of energy storage battery cell is improved, and the production efficiency of the battery cell is enhanced.

DETAILED DESCRIPTION OF THE PREFERRED EXAMPLES

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. Based on the embodiments of the present application, all the other embodiments obtained by those of ordinary skill in the art are within the scope of the present application.

Figure 1A:
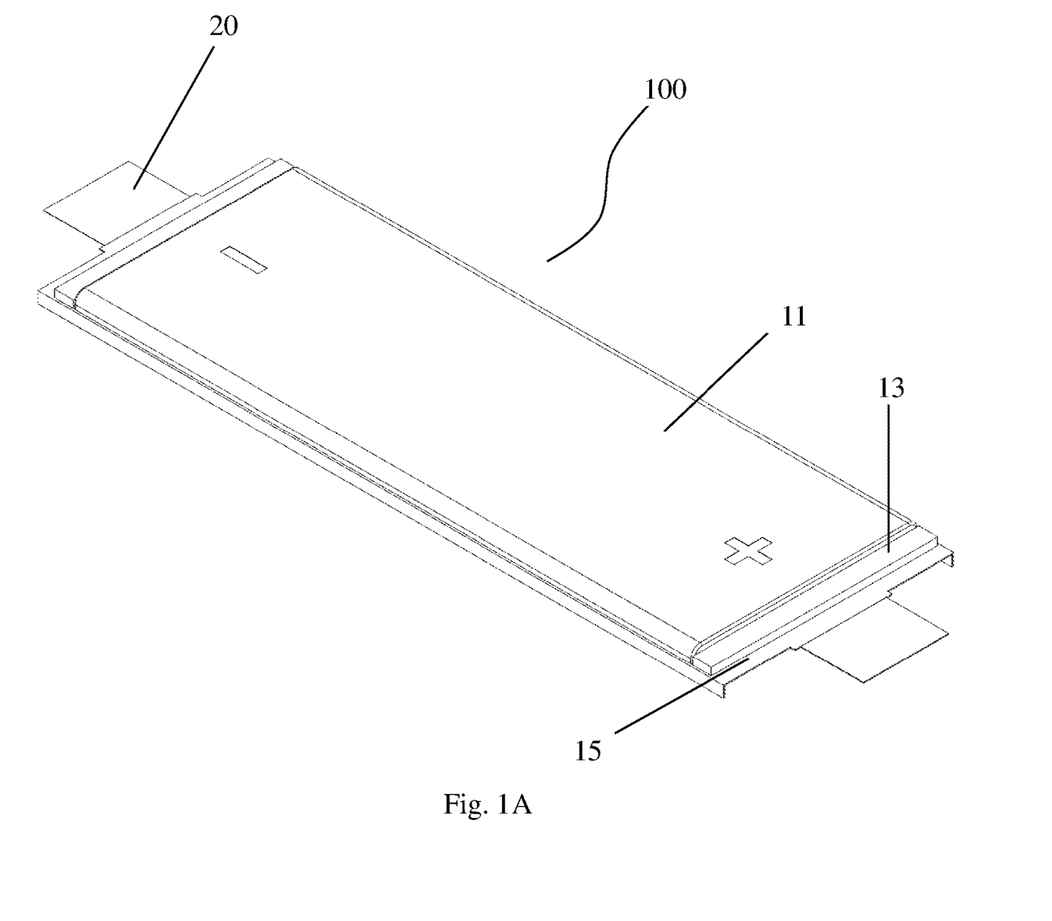
FIG. 1A is a structural schematic view of a battery cell according to an embodiment of the present application.
Figure 1B:
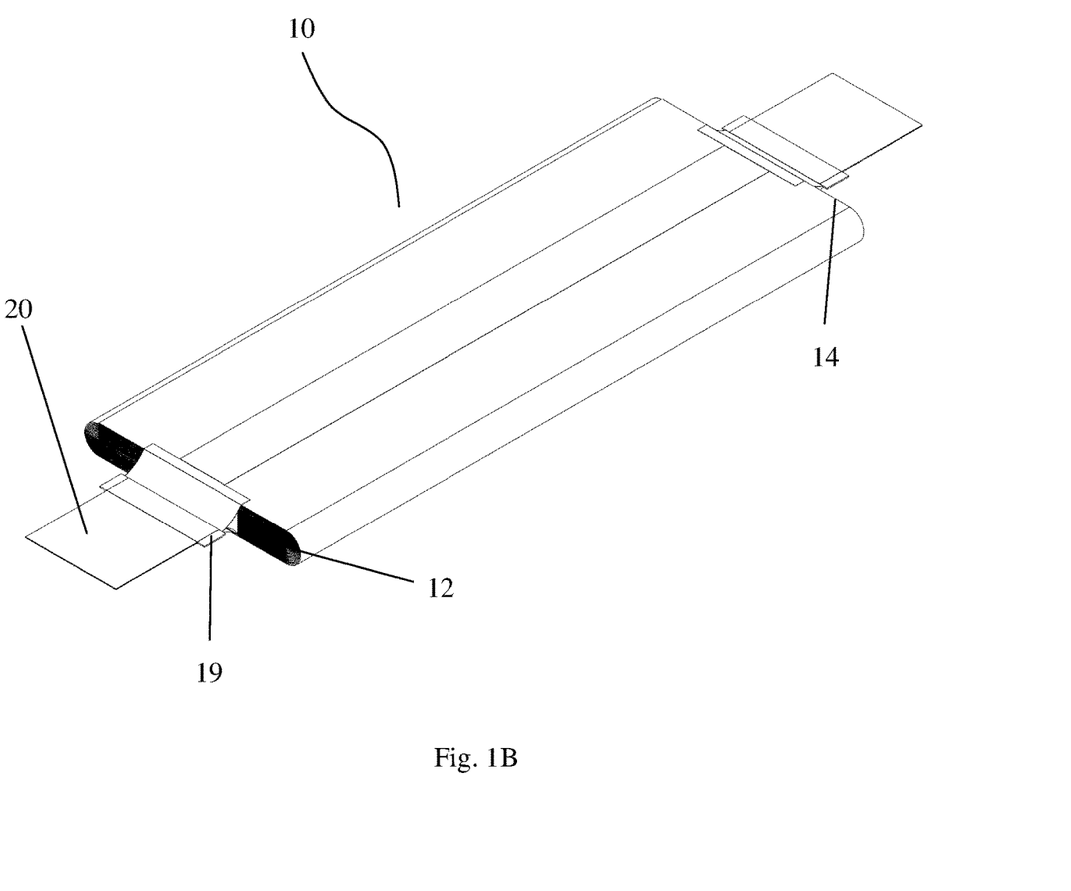
FIG. 1B is a structural schematic view of an electrode assembly according to an embodiment of the present application.

FIG. 1A is a structural schematic view of a battery with a battery cell 100 according to an embodiment of the present application. The battery cell 100 includes an electrode assembly 10 and a package bag 11 accommodating the electrode assembly 10, and the package bag 11 may be an aluminum plastic film. The electrode assembly 10 may be a wound structure as shown in FIG. 1B or a laminated structure. FIG. 1B shows the electrode assembly 10 after the adapter welding process, which may include a tab 20, and the tab 20 extends from the package bag 11. The battery cell 100 includes an unsealed region 13 and a seal region 15, and the unsealed region 13 is disposed between the electrode assembly 10 and the seal region 15. The tab 20 is connected to the seal region 15 by a tab adhesive to achieve sealing of the battery cell 100.

Referring to FIG. 1B, the electrode assembly 10 includes a first end surface 12 and a second end surface 14 disposed opposite to the first end surface 12. The tab 20 may be threaded out of at least one of the first end surface 12 and the second end surface 14. In some embodiments, the tab 20 has a welding region 19, and the welding region 19 is received in the package bag 11.

According to an embodiment of the present application, the battery cell 100 includes a support assembly 16, and the support assembly 16 is disposed between the electrode assembly 10 and the package bag 11. Specifically, the support assembly 16 is disposed between the electrode assembly 10 and the seal region 15, and the package bag 11 at the unsealed region 13 of the battery cell 100 is cratered to accommodate the support assembly 16.

Figure 2A:
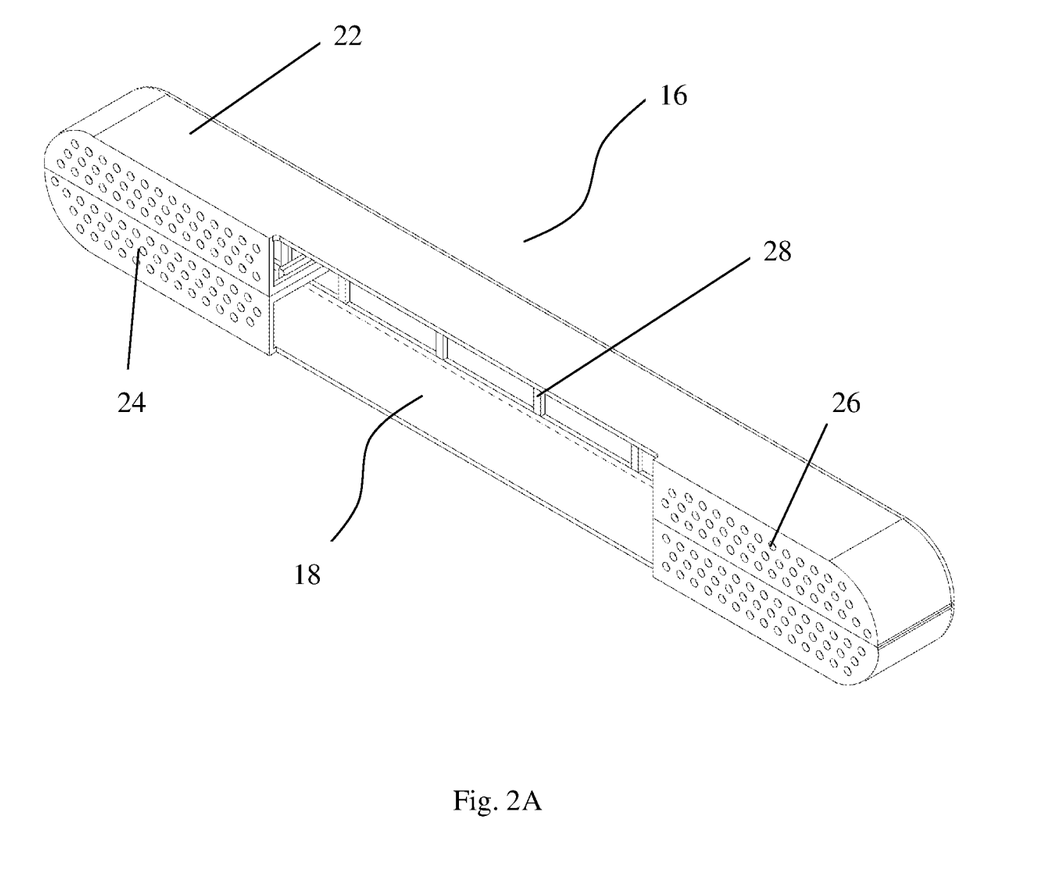
FIG. 2A is a structural schematic view of a support assembly according to an embodiment of the present application.
Figure 2B:
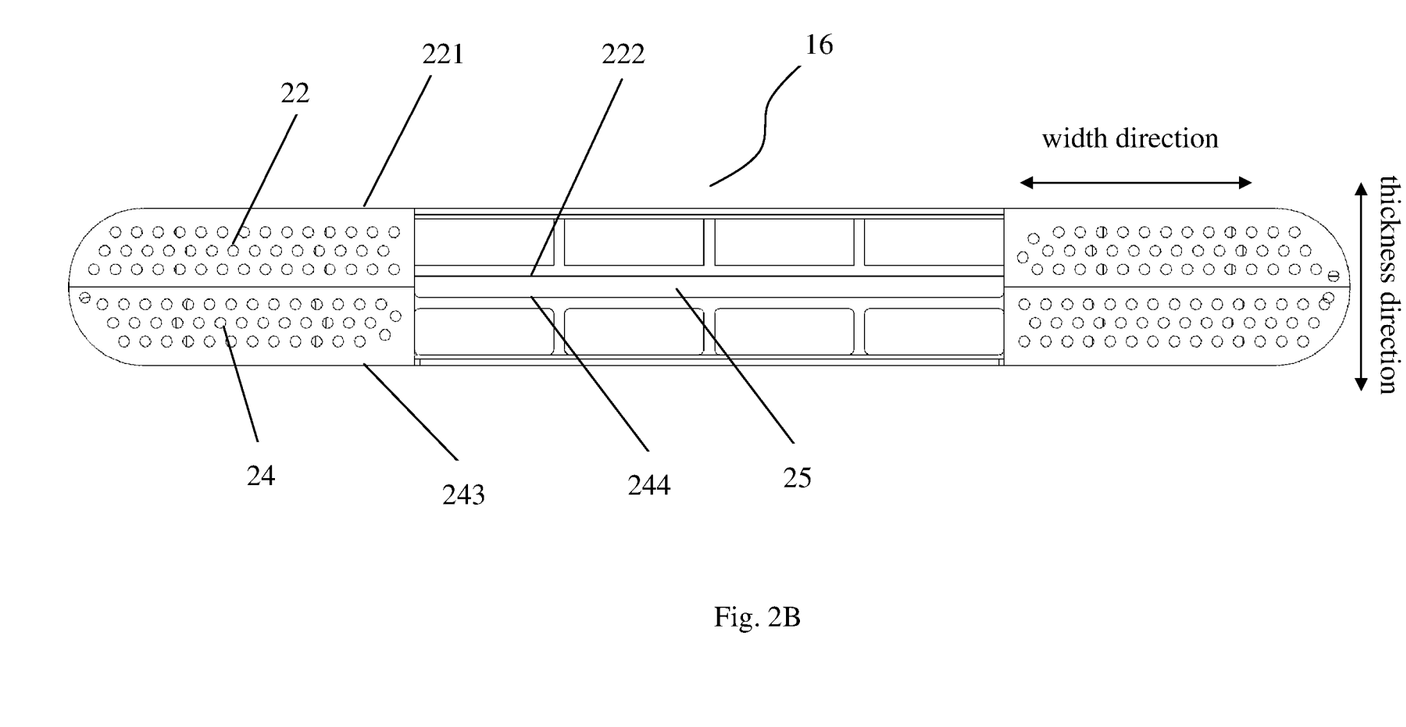
FIG. 2B is a front view of the support assembly of FIG. 2A.
Figure 2C:
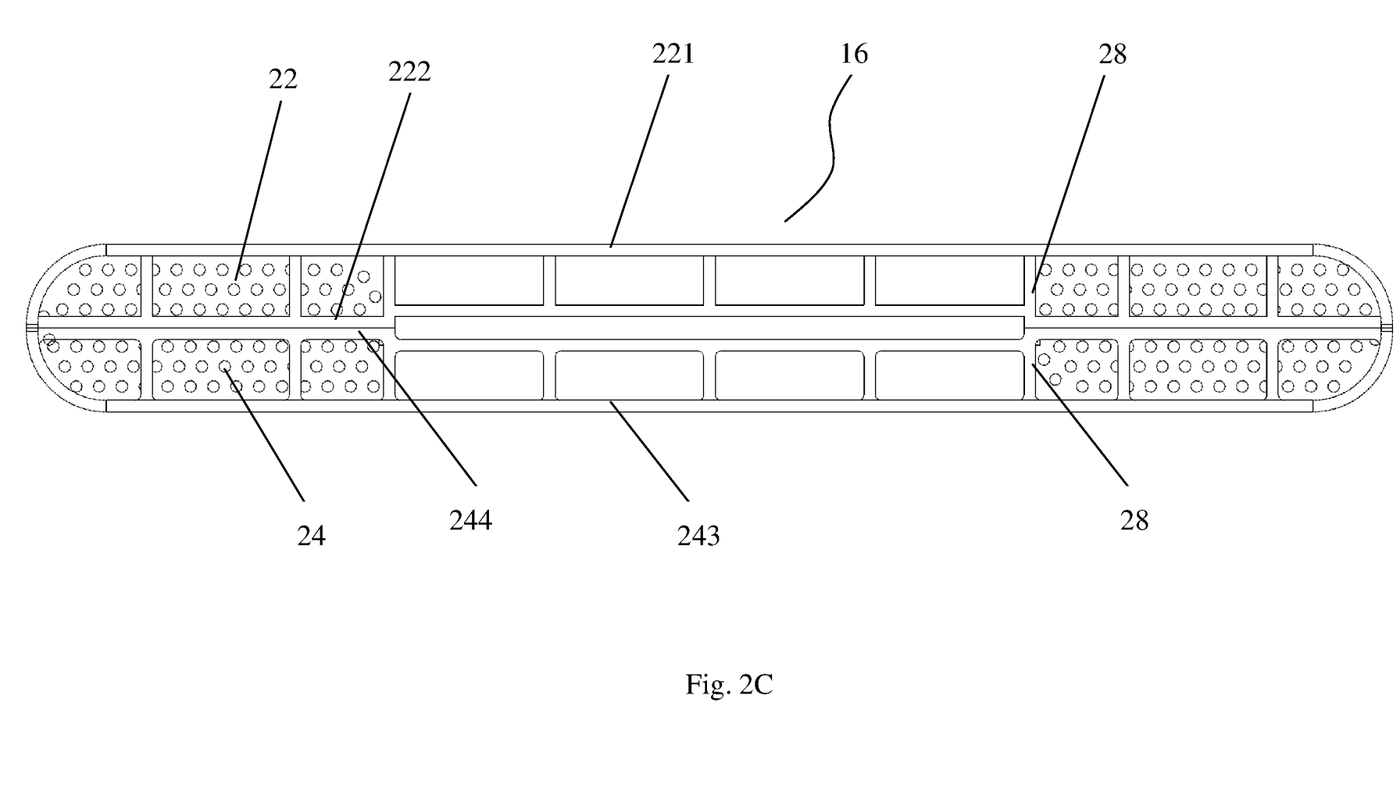
FIG. 2C is a rear view of the support assembly of FIG. 2B.

FIGS. 2A-2C show the structure views of the support assembly 16 according to an embodiment of the present application. The support assembly 16 has a cavity 18, and the cavity 18 is disposed opposite to the first end surface 12 or the second end surface 14, i.e., the opening of the cavity 18 faces the first end surface 12 or the second end surface 14. In an embodiment, the support assembly 16 is disposed between at least one of the first end surface 12 and the second end surface 14 and the package bag 11. In other words, the support assembly 16 is disposed at the end of the electrode assembly 10, or the support assembly 16 is disposed at the unsealed region 13 of the battery cell. According to the embodiment of the present application, the package bag 11 of the unsealed region 13 is cratered to create a space for storing the electrolyte, and the support assembly 16 is disposed at the end of the electrode assembly 10 (i.e., disposed at the unsealed region 13), to prevent the space for storing the electrolyte from collapsing during the manufacturing process and using process of the battery cell 100. Therefore, during the use of the battery cell 100, a sufficient amount of the electrolyte of storage space is ensured, and the energy density, sealing performance and abuse safety performance of the battery cell are not affected.

According to an embodiment of the present application, the tab 20 extends out of first end surface 12 or the second end surface 14 through the cavity 18 of the support assembly 16. In other words, the support assembly 16 partially encloses the tab 20. In an embodiment, as shown in FIGS. 2A to 2C, the support assembly 16 includes a first assembly 22 and a second assembly 24 disposed opposite to the first assembly 22. The first assembly 22 is provided with the cavity 18, and the tab 20 extends between the first assembly 22 and the second assembly 24, the first assembly 22 is connected to the second assembly 24 to partially enclose the tab 20. Specifically, one end of the tab 20 extends out of the package bag 11 through the cavity 18, and the welding region 19 may be received in the cavity 18 of the support assembly 16. Through such a design, the contact between the welding region 19 of the tab 20 and the package bag 11 is isolated, preventing the welding region 19 from piercing the aluminum plastic film, and improving the package reliability of the battery cell 100. In some embodiments, the second assembly 24 may also be provided with a cavity 18.

Figure 3A:
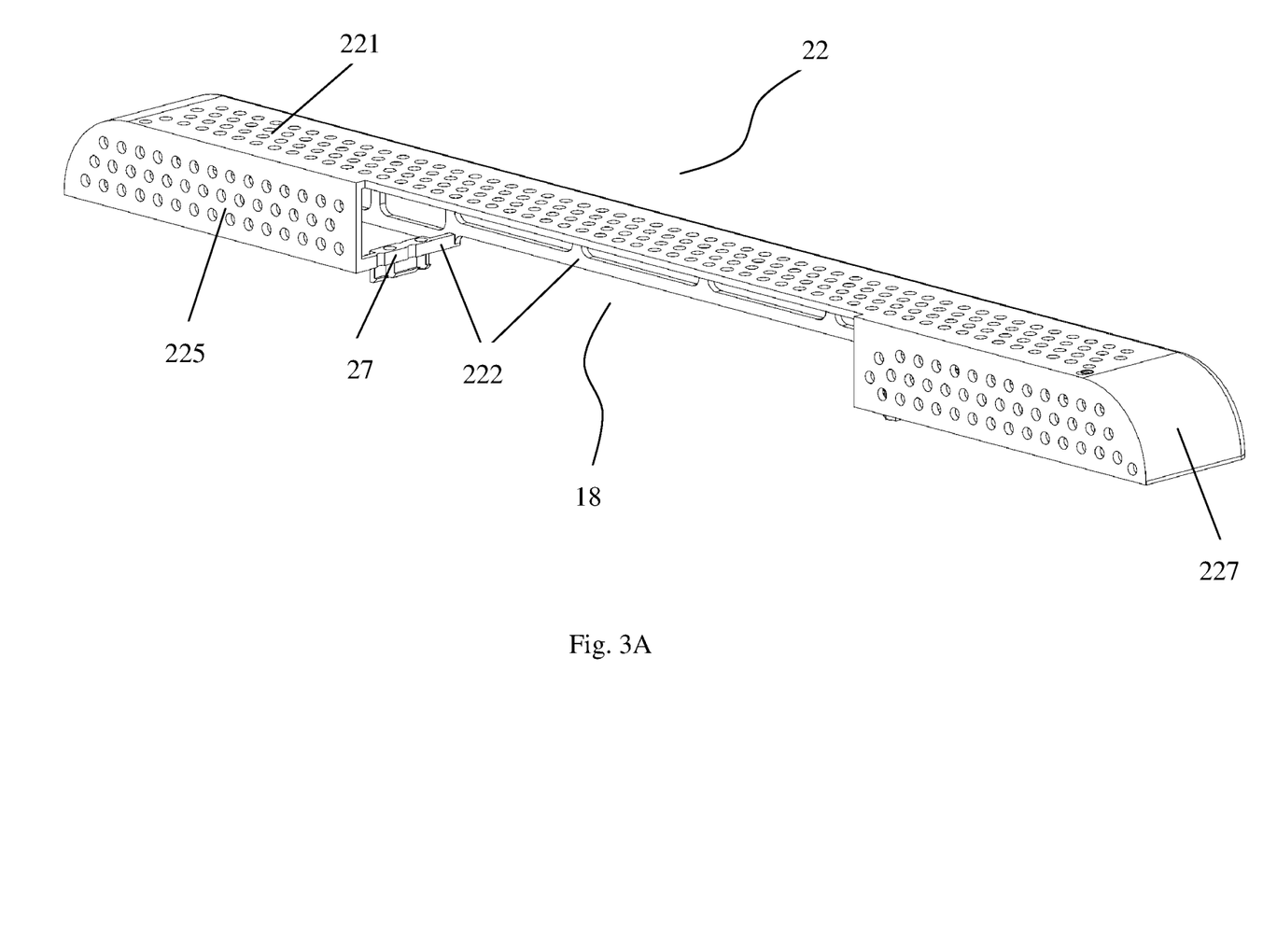
FIG. 3A is a structural schematic view of a support assembly according to another embodiment of the present application.

According to an embodiment of the present application, referring specifically to FIG. 3A, the first assembly 22 includes a first portion 221 and a second portion 222 connected to the first portion 221, and the cavity 18 is defined by the first portion 221 and the second portion 222. In an embodiment, the first portion 221 and the second portion 222 are disposed in parallel and the second portion is perpendicular to the first end surface 12 or the second end surface 14. In an embodiment, the second assembly 24 may include a third portion 243 and a fourth portion 244 that are identical or similarly designed as the first portion 221 and the second portion 222, and for example, the cavity 18 may be defined by the third portion 243 and the fourth portion 244. The first portion 221 and the third portion 243 are oppositely disposed, and the second portion 222 and the fourth portion 244 are oppositely disposed. The second portion 222 and the fourth portion 244 may define an opening 25 for receiving the tab 20, and the tab 20 may access from the opening 25 and then may be passed out of the package bag 11.

According to an embodiment of the present application, at least one of the first portion 221 and the second portion 222 is provided with a through hole 26. The battery cell 100 further includes an electrolyte contained in the package bag 11. By providing the through hole 26, the storage amount of the electrolyte in the battery cell may be further increased, thereby further prolonging the cycle life of the battery cell 100. In some embodiments, the third portion 243 or the fourth portion 244 may also be provided with through holes 26 to further increase the storage amount of electrolyte in the battery cell.

According to an embodiment of the present application, the first assembly 22 further includes a reinforcing rib 28, and one end of the reinforcing rib 28 is connected to the first portion 221 and the other end thereof is connected to the second portion 222. In some embodiments, the second assembly 24 may also include the reinforcing rib 28, and two ends of the reinforcing rib 20 are connected to the third portion 243 and the fourth portion 244, respectively. The design of the reinforcing rib 28 may further increase the strength of the support assembly 16 to avoid collapse of the battery cell at the unsealed region 13. In some embodiments, at least one of the first portion 221, the second portion 222, the third portion 243, or the fourth portion 244 may be formed of reinforcing ribs 28 disposed in a crosswise manner, so that the storage space of the electrolyte may be further increased to further prolong the cycle life of the battery cell.

In an embodiment, the first assembly 22 further includes an arcuate portion 227, and both ends of the first portion 221 are connected to both ends of the second portion 222 through the arcuate portion 227, respectively. The second assembly 24 may also include a second arcuate portion 248 that is identical or similar in design to the arcuate portion 227, and both ends of the third portion 243 are connected to both ends of the fourth portion 244 through the second arcuate portion 228, respectively. By providing the arcuate portion 227 and the second arcuate portion 248, the support assembly 16 may have the same or similar cross-section as the electrode assembly 10, facilitating to package the battery cell. In an embodiment, a thickness of the support assembly 16 is less than or equal to a thickness of the electrode assembly 10. When the thickness of the support assembly 16 is equal to the thickness of the electrode assembly 10, a depth of the crater of the package bag 11 for accommodating the support assembly 16 may be equal to a depth thereof for accommodating the electrode assembly 10. When a width of the support assembly 16 is equal to a width of the electrode assembly 10, the width of the crater of the package bag 11 for accommodating the support assembly 16 may be equal to the width thereof for accommodating the electrode assembly 10. When the thickness and width of the support assembly 16 are respectively equal to the thickness and width of the electrode assembly 10, the first portion 221, the second portion 222, the third portion 243, the fourth portion 244, the arcuate portion 227, and the second arcuate portion 248 may be flush with the surface of the electrode assembly 10 to facilitate packaging of the battery cell.

According to an embodiment of the present application, the first assembly 22 further includes a fifth portion 225 adjacent to the first end surface 12 or the second end surface 14, and the fifth portion 225 may be connected to the first portion 221, the second portion 222, and the arcuate portion 227, respectively. In some embodiments, the fifth portion 225 is provided with a through hole 26. In some embodiments, both ends of the first assembly 22 may be respectively provided with the fifth portion 225 described above. In an embodiment, the second assembly 24 may also include a sixth portion 246 that is identical or similar in design to the fifth portion 225. The sixth portion 246 may be connected to the third portion 243, the fourth portion 244, and the arcuate portion 248, respectively. The sixth portion 246 may be disposed opposite to the fifth portion 225 and the sixth portion 246 is disposed adjacent to the first end surface 12 or the second end surface 14. In an embodiment, the first assembly 22 and the second assembly 24 are symmetrically disposed about the contact surfaces that are in contact with each other.

Figure 3B:
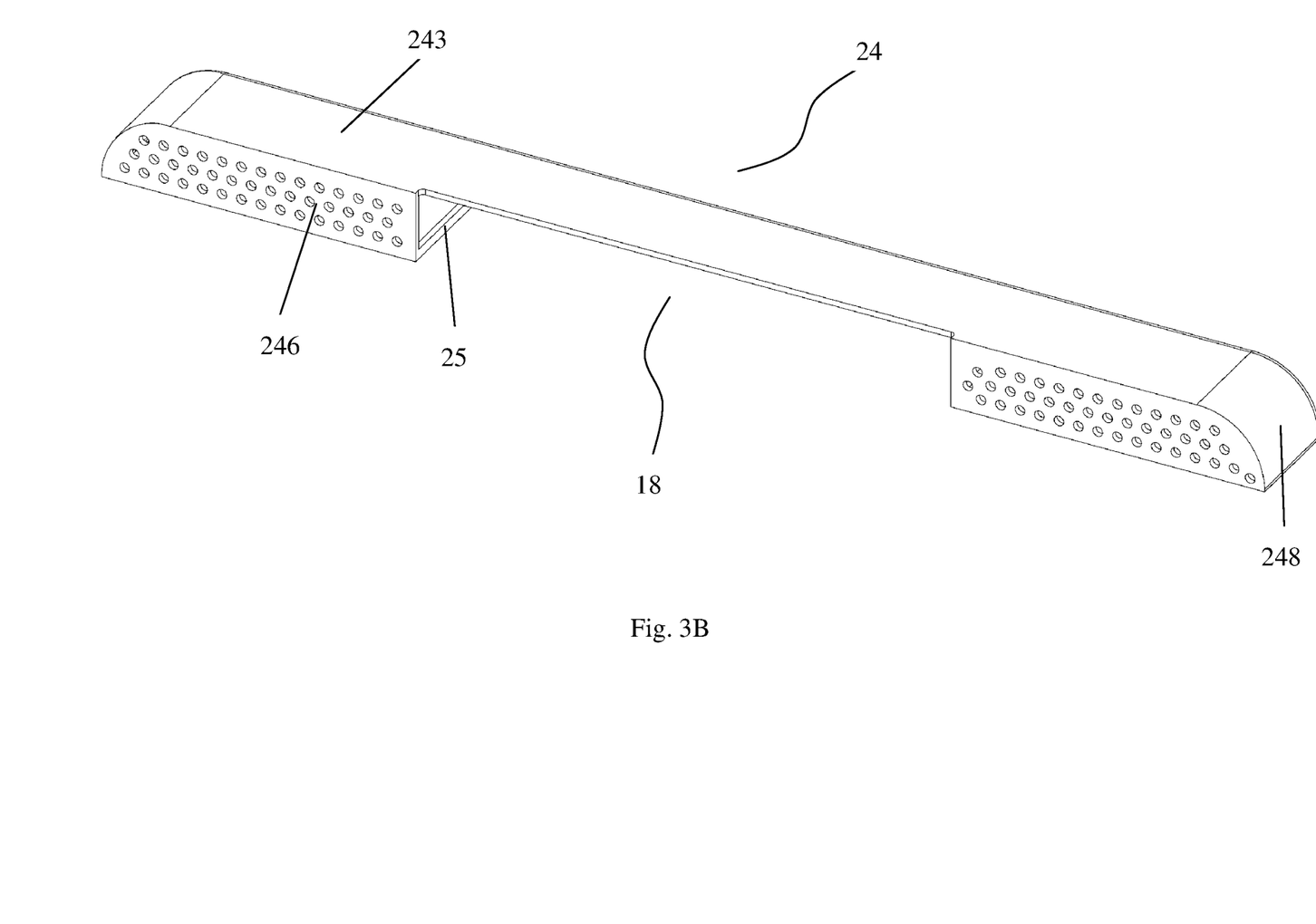
FIG. 3B is a structural schematic view of a support assembly according to another embodiment of the present application.
Figure 3C:
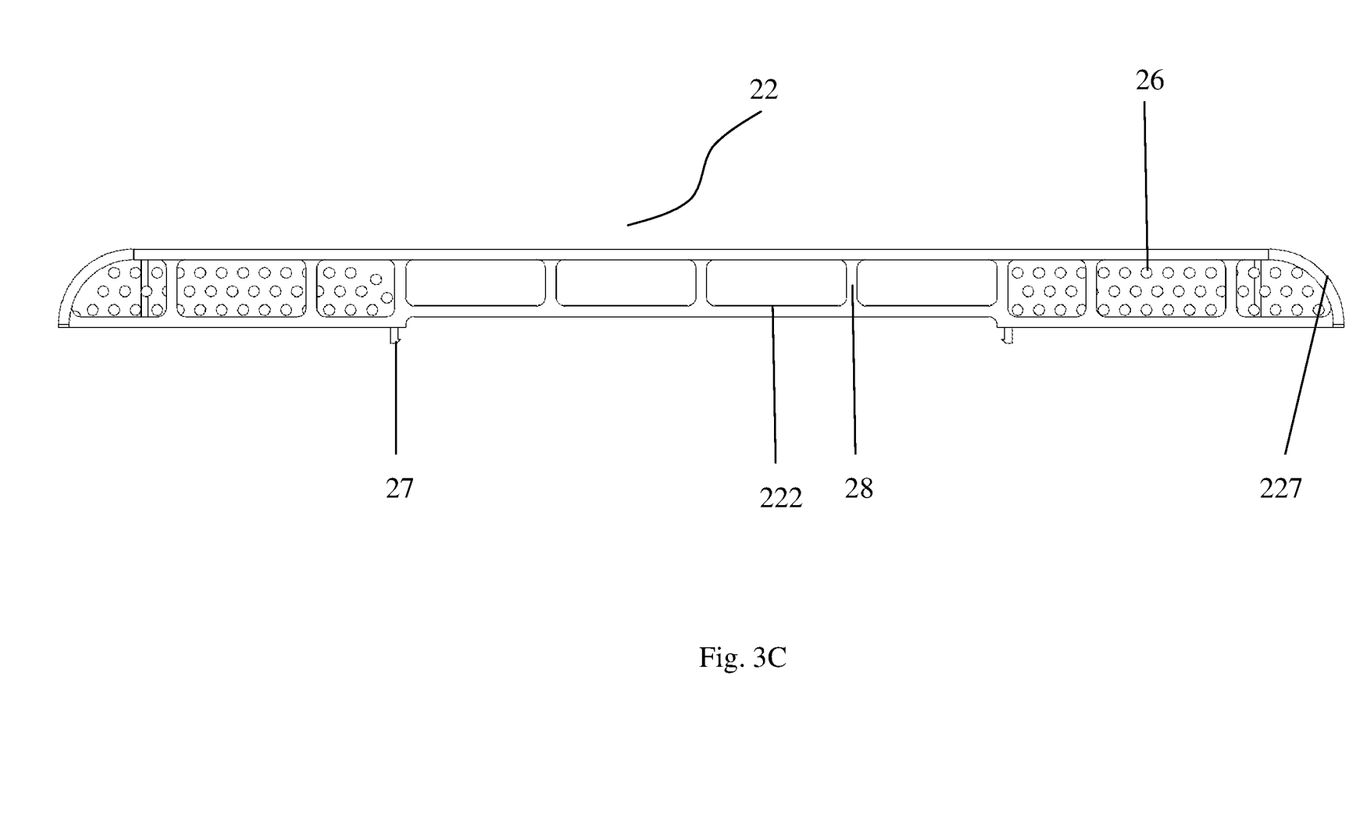
FIG. 3C is a rear view of the support assembly of FIG. 3A.

According to an embodiment of the present application, the first assembly 22 is detachably connected to the second assembly 24. By this detachable connection, the assembly of the support assembly 16 and the tab 20 is more convenient, and the production efficiency may be improved. In an embodiment, referring specifically to FIGS. 3A-3C, one of the first assembly 22 and the second assembly 24 is provided with a socket 25, and the other is provided with a buckle 27 engageable with the socket 25. The socket 25 and the buckle 27 may be disposed on the second portion 222 or the fifth portion 225, and the fourth portion 244 or the sixth portion 246, respectively.

Figure 4:
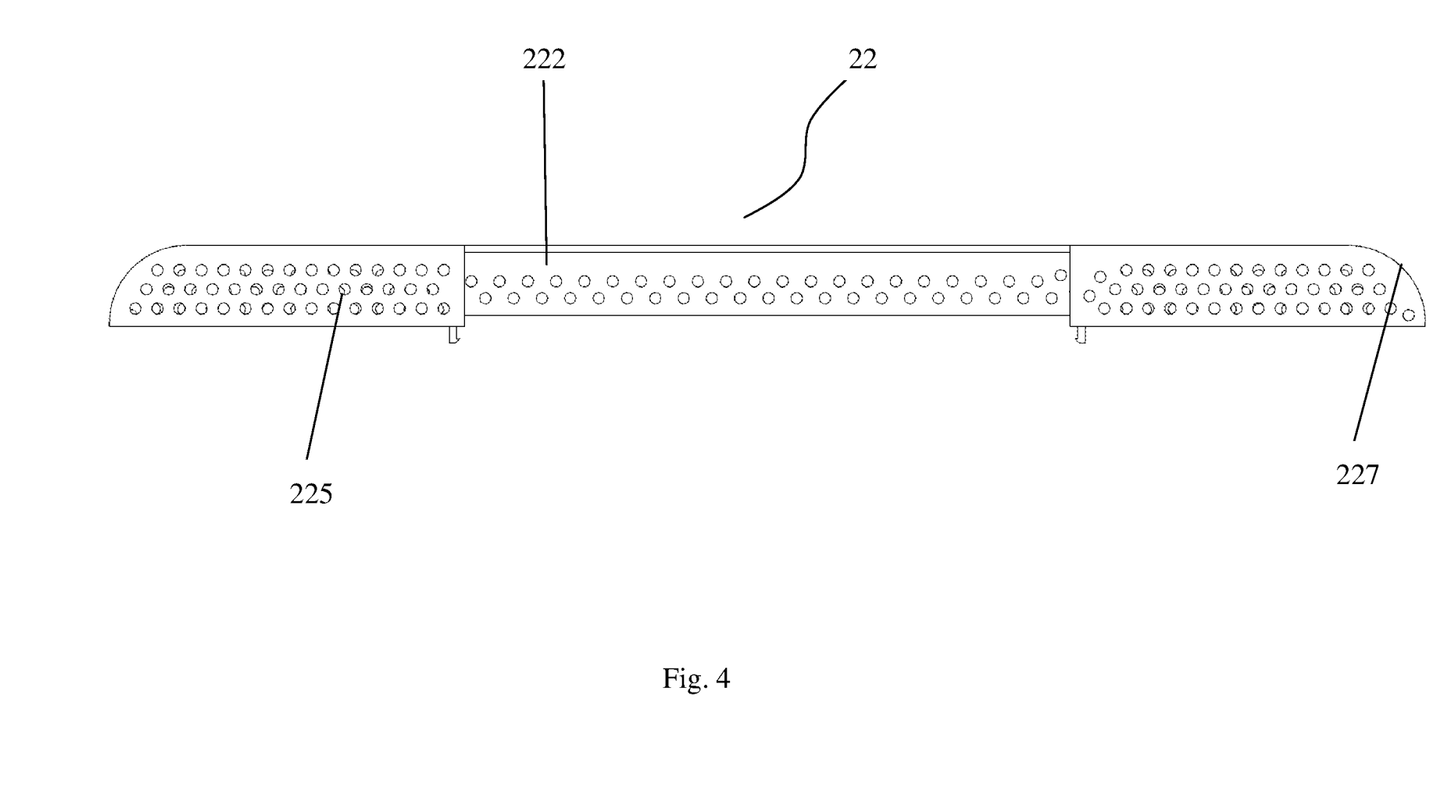
FIG. 4 is a front view of a support assembly according to another embodiment of the present application.

In the embodiment of the present application, as shown in FIG. 4, the first portion 221, the third portion 243, the fifth portion 225, and the sixth portion 246 may be simultaneously provided with the through holes 26 to further increase the storage space of the electrolyte, thereby further prolonging the cycle life of the battery cell. In an embodiment, the structure connecting with the first portion 221 and the second portion 222 is a wall provided with the through hole 26, and the structure connecting the third portion 243 and the fourth portion 244 is a wall provided with the through hole 26.

According to the embodiment of the present application, during use of the battery cell 100, the unused space in the unsealed region of the package region of the soft-pouch battery cell is fully utilized to increase the storage amount of the electrolyte in the battery cell, which may meet the consumption requirement of the electrolyte for the energy storage battery cell 100 during the long cycle use, that is, which may prolong the cycle life of the battery cell. Compared with the existing method of changing the width or length of the battery cell to increase the storage amount of the electrolyte, the battery cell according to the embodiments of the present application may increase the energy density of the battery cell, and not affect the package performance of the battery cell.

In the embodiment of the present application, the design of the support assembly 16 may isolate the welding region 19 of the tab 20 from the package bag 11, thereby preventing the welding region 19 from piercing the aluminum plastic film, and improving the package reliability of the battery cell 100. In an embodiment, the support assembly 16 may be made of a polypropylene (PP) material, which is the same material as the inner layer of aluminum plastic film of the package bag 11, i.e., the support assembly 16 does not undergo any chemical reaction with the electrolyte.

The support assembly 16 of the embodiments of the present application enable the free electrolyte to be stored at both ends of the battery cell 100, ensuring that the electrolyte is not unevenly distributed due to the pressure unevenness of the body of the battery cell 100, further ensuring that during the circulation of the battery cell, the electrolyte may continuously wet the inside of the electrode assembly 10, and the electrode assembly 10 may not suffer from a lack of electrolyte.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery cell, comprising:
    an electrode assembly comprising a first end surface and a second end surface disposed opposite to the first end surface; and
    a package bag accommodating the electrode assembly, wherein the battery cell further comprises:

a support assembly disposed between the electrode assembly and the package bag, and the support assembly has a cavity disposed opposite to the first end surface or the second end surface, wherein the support assembly comprises a first assembly provided with the cavity and a second assembly disposed opposite to the first assembly, wherein the first assembly comprises a first portion and a second portion connecting with the first portion, the cavity is cooperatively defined by the first portion and the second portion, and at least one of the first portion and the second portion is provided with a through hole.

2. The battery cell according to claim 1, wherein the support assembly is disposed between the package bag and at least one of the first end surface and the second end surface.

3. The battery cell according to claim 2, wherein the electrode assembly further comprises a tab, and the tab extends out of the first end face or the second end face through the cavity.

4. The battery cell according to claim 3, wherein the tab extends between the first assembly and the second assembly.

5. The battery cell according to claim 1, wherein the first assembly is detachably connected to the second assembly.

6. The battery cell according to claim 1, wherein the first assembly further comprises a reinforcing rib, one end of the reinforcing rib is connected to the first portion, and the other end of the reinforcing rib is connected to the second portion.

7. The battery cell according to claim 1, wherein the first assembly further comprises an arcuate portion, and both ends of the first portion are respectively connected to both ends of the second portion through the arcuate portion.

8. The battery cell according to claim 7, wherein the first assembly further comprises a fifth portion adjacent to the first end surface or the second end surface, the fifth portion is connected to the first portion, the second portion, and the arcuate portion; and the fifth portion is provided with the through hole.

9. A battery, comprising:
a battery cell, comprising:
an electrode assembly comprising a first end surface and a second end surface disposed opposite to the first end surface;
a package bag accommodating the electrode assembly; and
a tab;
wherein the battery cell further comprises:
a support assembly disposed between the electrode assembly and the package bag, and the support assembly has a cavity disposed opposite to the tab and the first end surface or the second end surface,
wherein the support assembly comprises a first assembly provided with the cavity and a second assembly disposed opposite to the first assembly,
wherein the first assembly comprises a first portion and a second portion connecting with the first portion, the cavity is cooperatively defined by the first portion and the second portion, and at least one of the first portion and the second portion is provided with a through hole.

10. The battery according to claim 9, wherein the support assembly is disposed between the package bag and at least one of the first end surface and the second end surface.

11. The battery according to claim 10, wherein the tab extends out of the first end face or the second end face through the cavity.

12. The battery according to claim 11, wherein the the tab extends between the first assembly and the second assembly.

13. The battery according to claim 9, wherein the first assembly is detachably connected to the second assembly.

14. The battery according to claim 9, wherein the first assembly further comprises a reinforcing rib, one end of the reinforcing rib is connected to the first portion, and the other end of the reinforcing rib is connected to the second portion.

15. The battery according to claim 9, wherein the first assembly further comprises an arcuate portion, and both ends of the first portion are respectively connected to both ends of the second portion through the arcuate portion.

16. The battery according to claim 15, wherein the first assembly further comprises a fifth portion adjacent to the first end surface or the second end surface, the fifth portion is connected to the first portion, the second portion, and the arcuate portion, and the fifth portion is provided with the through hole.

* * * * *